United States Patent
Dietrich

[15] 3,685,876

[45] Aug. 22, 1972

[54] PIVOT PIN BEARING FOR USE IN PLASTIC PIANO ACTIONS AND THE LIKE

[72] Inventor: Walter E. Dietrich, Cincinnati, Ohio

[73] Assignee: D. H. Baldwin Company, Cincinnati, Ohio

[22] Filed: June 21, 1971

[21] Appl. No.: 154,760

[52] U.S. Cl. .....................308/37, 84/251, 308/238
[51] Int. Cl. .........................F16c 17/02, F16c 33/20
[58] Field of Search ............308/37, 237, 238; 16/2; 84/251, 452 P

[56] References Cited

UNITED STATES PATENTS

| | | |
|---|---|---|
| 3,317,255 | 5/1967 | Wehlau .....................308/37 |
| 3,186,287 | 6/1965 | Wehlau ....................308/238 |
| 3,018,146 | 1/1962 | Euwe et al. ................308/238 |
| 3,372,960 | 3/1968 | Fisher ........................308/238 |
| 3,604,765 | 9/1971 | Babcock ....................308/238 |

Primary Examiner—Martin P. Schwadron
Assistant Examiner—Barry Grossman
Attorney—John W. Melville et al.

[57] ABSTRACT

A plastic member having a pivot pin bearing constituted by a hole of polygonal cross-section is disclosed. Parallel to each side of said polygonal hole and spaced slightly outwardly therefrom, there is a cavity or relief in said member to provide a capability for sufficient deflection of said sides to compensate for small dimensional variations. Since the two ends of each side are fixed, the stiffness of the bearing is maintained so as to minimize the tendency of a part pivoted in said bearing to vibrate when off-center forces are applied.

15 Claims, 8 Drawing Figures

PATENTED AUG 22 1972 3,685,876
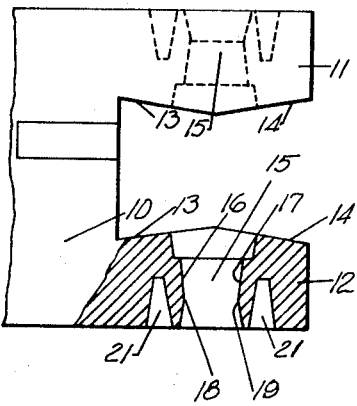
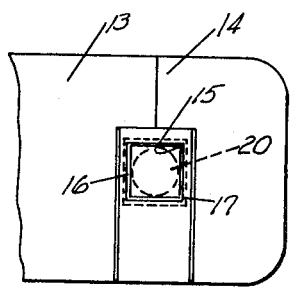
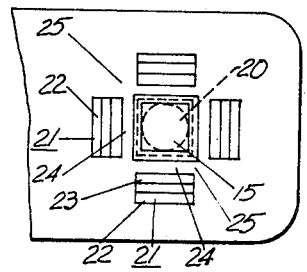
*Fig 1*  *Fig 2*  *Fig 3*
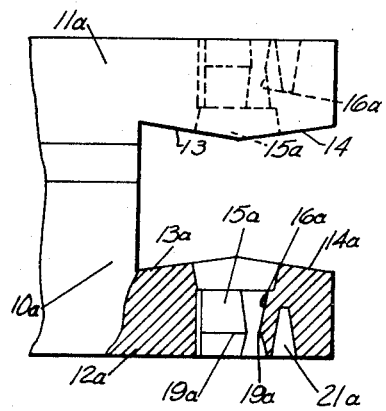
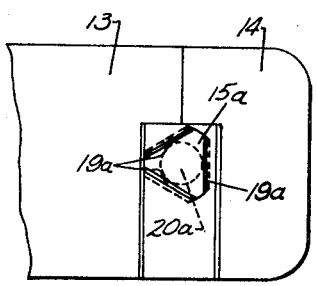
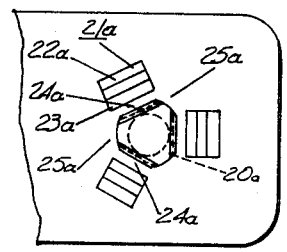
*Fig 4*  *Fig 5*  *Fig 6*
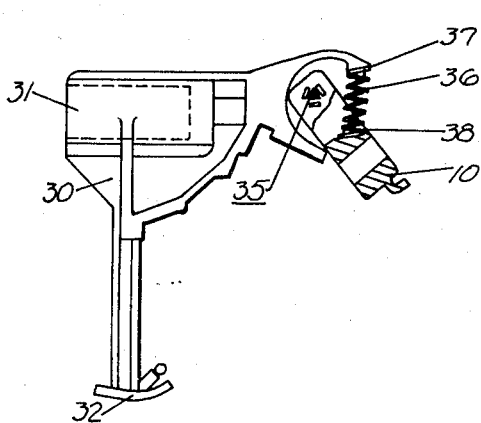
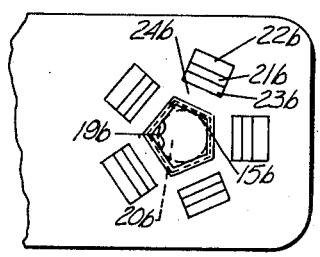
*Fig 7*  *Fig 8*
INVENTOR/S
WALTER E. DIETRICH
BY Melville, Strasser, Foster and Hoffman
ATTORNEYS

PIVOT PIN BEARING FOR USE IN PLASTIC PIANO ACTIONS AND THE LIKE

CROSS REFERENCE TO RELATED APPLICATION

This application relates to improvements in pivot pin bearing in a rail flange of a piano action disclosed in copending application Ser. No. 790,807, filed Jan. 13, 1969, in the names of Merton D. Corwin and Walter E. Dietrich, now U. S. Pat. No. 3,583,271, issued Apr. 27, 1971.

BRIEF SUMMARY OF THE INVENTION

For a general description of a piano action in which this invention finds particular utility, reference may be had to the above mentioned copending application. It will be described herein with particular application to a piano action, although it will be useful in any mechanical movement involving pivotal movement of small and delicate parts.

The difficulties inherent in attempts to provide pivot pin bearings in both wood and plastic members, and the problems involved therein, are described at some length in U. S. Pat. No. 3,186,287, issued June 1, 1965, and U. S. Pat. No. 3,317,255, issued May 2, 1967, both in the name of Christian Henry Wehlau. The Wehlau patents disclose attempts to solve some of the problems which are encountered. They do indeed solve some of the problems, but the solutions are not completely satisfactory. It has been found that when molded plastic bearings are used in plastic members, they frequently contribute to torsional vibration os such magnitude that they permit one hammer of a piano action to touch an adjacent hammer. Such excessive vibration in the hammer of a piano action is known in the industry as "dancing hammer."

According to the present invention, the bearing is integrally molded in a plastic member (as, for example, the rail flange or mounting flange of a piano action) so as to eliminate the need for a separate bearing which must be press-fitted accurately in a hole provided for the purpose in the plastic member. Such a press-fit must be tight enough to prevent any movement of the bearing with respect to the member; and with such a tight fit stress is introduced in the member which frequently results in a radial split at the mounting hole of the plastic part after the parts have aged.

The problem of "dancing hammer" resulting from torsional vibration is overcome by providing flexible walls in a polygonal configuration for the pivot pin bearing, by leaving the adjoining ends of said walls fixed integrally in said member. In this way, while reducing the contribution of the pivot pin bearing to torsional vibration, sufficient flexibility is retained to compensate for small dimensional variations.

BRIEF DESCRIPTION OF THE DRAWINGS

FIG. 1 is a fragmentary plan view with parts in cross-section of the clevis end of a rail flange incorporating pin bearings according to the invention.

FIG. 2 is a fragmentary elevational view of one of the arms of the clevis as seen from the inside.

FIG. 3 is a fragmentary elevational view of one of the arms of the clevis as seen from the outside.

FIG. 4 is a view similar to FIG. 1 showing a modification.

FIG. 5 is a view similar to FIG. 2, of said modification.

FIG. 6 is a view similar to FIG. 3, of said modification.

FIG. 7 is an elevational view of a hammer butt assembly with a rail flange according to the present invention.

FIG. 8 is a view similar to FIG. 3 illustrating another modification.

DETAILED DESCRIPTION

The part to be provided with pivot pin bearings may be a rail flange or mounting flange of a piano action or the clevis of the jack or fly member. The clevis end of a rail flange is indicated at 10 in FIG. 1. The clevis is provided with arms 11 and 12. In recent years parts of piano actions, such as rail flanges and others, have been made of plastic. Generally, they have been made of "Nylon" which is a polyamide resin and which is sometimes fiber filled. In other instances ABS polymer resins, which are combinations of styrene-acrylonitrile and butadiene-acrylonitrile resin components, have been used, as has "Delrin," which is an acetal polymer resin. It will be understood that the particular materials do not constitute a part of this invention, noting only that the material must be resilient and have a low coefficient of friction and therefore the term "plastic" will be used herein to identify the material involved. It will also be understood that the details of the configuration of the rail flange do not constitute a part of the invention which is described only to the pivot pin bearing.

As seen in FIG. 1, the arms 11 and 12 of the clevis as seen in plan view, exhibit dihedral inner surfaces 13 and 14 which serve to provide a minimum of contact surface with the oscillating member if that member should impinge against either arm of the clevis, either because of side play or slight misalignment of the pivot pin. In the embodiment of FIGS. 1 to 3 inclusive, the pivot pin bearing is constituted by a square hole 15 in each arm of the clevis, the holes being of course axially aligned. While the holes are square in cross-section, the cross-section is not uniform in that each side wall of the hole exhibits an obtuse dihedral angle. This can be seen with the opposes side walls 16 and 17. The apices of these dihedral angles 18 and 19 are near the outer side of the arms of the clevis. Thus, on either side of the apices 18, 19 the holes are frusto-pyramidal and a "waist" is provided by the apices of the dihedrals of the four side walls. The pivot pin 20, which is of course cylindrical, is illustrated in dotted lines in FIGS. 2 and 3, 133 has its bearing against these apices, which are tangent to the cylinder, so that in effect the pivot pin constitutes in cross-section a circle incurred within a square.

Because of the great difficulty in machining plastic parts or molding plastic parts to close tolerances, provision is made for a small degree of deflection in the inside walls of the hole 15. This is accomplished by means of holes or reliefs 21 formed on the outside of each of the arms of the clevis. As best seen in FIG. 3, these reliefs are rectangular and have the sloping walls 22 and 23. In depth, as best seen in FIG. 1, they extend inwardly well beyond the apices 18, 19 mentioned above.

From a consideration of FIG. 3, it will be clear that the long sides of the rectangular reliefs 21 are substantially the same length as the width of the hole 15 and are spaced a small distance from the hole so as to leave the areas 24 which are yieldable with the portions 25 at the corners of the hole remaining rigid. However, the lengths of the reliefs 21 may be varied to control the amount of deflection at the centers of the portions 24 opposite the points at which the pivot pin engages the side walls of the hole.

The embodiment of FIGS. 4 to 6 inclusive differs from that of FIGS. 1 to 3 only in that the polygonal hole, instead of being square, is triangular in cross-section. The hole is again indicated at 15a and one of the side walls thereof is indicated at 16a. These walls again have the dihedral angle providing apices, each indicated at 19a which engage the pivot pin 20a. The reliefs are indicated at 21a. The configuration of the reliefs is the same as in the embodiment of FIGS. 1 to 3 and the same reference numerals with the postscript a have been used to identify the parts. Again, the corner portions have been left solid as at 25a and again the deflectable portions are provided at 24a.

In FIG. 7, there is shown by way of example a structure in which the pivot pin bearing of the present invention may be used. The rail flange is again indicated at 10 and a hammer butt is indicated at 30. It will be understood that a hammer shank is inserted into a socket 31 and the hammer butt has an extension 32 to contact the back check. A pivot pin bearing according to FIGS. 4 to 6 inclusive is indicated generally at 35 and the parts are spring urged by a helical compression spring 36 which seats on a protuberance 37 on a hammer butt and a similar protuberance 38 on a rail flange.

It will be evident that the bearing construction permits a slight deflection of the walls 24 or 24a to compensate for small dimensional changes and yet maintain stiffness by virtue of the fixed portions 25 or 25a so as to prevent excessive vibration when off-center forces are applied.

It will also be clear that the construction disclosed herein obviates the need for a separate bearing piece which must be accurately press-fitted into a hole in the clevis and which, because of the tightness required, often results in a radial split in the mounting hole after the parts have aged. Thus, the cost of a separate bearing and installation thereof is eliminated without substantial increase in the cost of the part.

It will be understood that additional modifications may be made without departing from the spirit of the invention and that therefore no limitations not specifically set forth in the claims are intended or should be implied. For example, as seen in FIG. 8, wherein like reference numerals with the postscript b have been used to identify the parts, the polygonal hole 15b may be pentagonal in cross-section with the pivot pin 20b contacting each of the apices 19b, the reliefs 21b permitting the portions 24b to flex.

The embodiments of the invention in which an exclusive property or privilege is claimed are defined as follows:

1. In a plastic member constituting an element in a mechanical movement; a pivot pin bearing comprising a polygonal hole, the side walls of said hole in axial cross-section presenting obtuse dihedral angles with the apices directed inwardly, said plastic member having a number of reliefs equal to the number of sides of said polygonal hole, said reliefs being of a depth greater than the distance from an end of said hole to said apices, and parallel to, and spaced a small distance from, the sides of said polygonal hole, so as to permit deflection of said hole sides to compensate for small dimensional variations without sacrifice in the rigidity of the bearing.

2. The structure of claim 1, wherein said reliefs are of rectangular cross-sections, and the walls of said reliefs, which are parallel to the side walls of said hole, taper inwardly to the bottoms thereof.

3. The structure of claim 2, wherein the lengths of reliefs are substantially equal of the widths of the side walls of said hole.

4. The structure claimed in claim 2 wherein the lengths of said reliefs are less than the widths of the side walls of said hole, whereby to control the deflection of said side walls, deflection decreasing as the lengths of said reliefs are decreased.

5. The structure of claim 1, wherein said hole is square in cross-section.

6. The structure of claim 1, whereins said hole is triangular in cross-section.

7. The structure of claim 1 wherein said hole is pentagonal in cross-section.

8. In a plastic member constituting an element in a mechanical movement, said plastic member having a clevis in which another member is pivotally mounted by means of a pivot pin; pivot pin bearings, axially aligned, in the arms of said clevis, each of said bearings comprising a polygonal hole, the side walls of said holes in axial cross-section presenting obtuse dihedral angles with their apices directed inwardly and disposed nearer the outer sides of said arms, said arms each having a number of reliefs equal to the number of sides os said polygonal holes, said reliefs extending from the outer sides of said arms to a depth beyond said apices, and being parallel to, and spaced from, the respective sides of said polygonal holes, so as to permit deflection of said hole sides to compensate for small dimensional variations without sacrificing the rigidity of said bearings.

9. The structure of claim 8, wherein said reliefs are of rectangular cross-section and the walls of said reliefs, which are parallel to the side walls of said holes, taper inwardly to the bottoms thereof.

10. The structure of claim 8 wherein the inner sides of the arms of said clevis are defined by dihedral surfaces the apices of which intersect the longitudinal axis of said holes.

11. The structure of claim 8, wherein the lengths of said reliefs are substantially equal to the widths of the side walls of said holes.

12. The structure of claim 8 wherein the lengths of said reliefs are less than the widths of the side walls of said holes, whereby to control the deflection of said side walls, deflection decreasing as the lengths of said reliefs are decreased.

13. The structure of claim 8 wherein said holes are square in cross section.

14. The structure of claim 8, wherein said holes are triangular in cross-section.

15. The structure of claim 8, wherein said holes are pentagonal in cross-section.

* * * * *